US009652535B2

(12) United States Patent
Sundaresan et al.

(10) Patent No.: US 9,652,535 B2
(45) Date of Patent: May 16, 2017

(54) PRESENTATION OF QUERY WITH EVENT-RELATED INFORMATION

(75) Inventors: Neelakantan Sundaresan, Mountain View, CA (US); Nishith Parikh, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1042 days.

(21) Appl. No.: 12/466,216

(22) Filed: May 14, 2009

(65) Prior Publication Data

US 2009/0287691 A1    Nov. 19, 2009

Related U.S. Application Data

(60) Provisional application No. 61/053,883, filed on May 16, 2008.

(51) Int. Cl.
G06Q 30/02    (2012.01)
G06F 17/30    (2006.01)

(52) U.S. Cl.
CPC .. *G06F 17/30864* (2013.01); *G06F 17/30867* (2013.01); *G06Q 30/02* (2013.01)

(58) Field of Classification Search
None
See application file for complete search history.

(56) References Cited

U.S. PATENT DOCUMENTS

| 7,519,613 | B2 * | 4/2009 | Guha et al. | |
| 2007/0112730 | A1 * | 5/2007 | Gulli et al. | 707/3 |
| 2009/0086755 | A1 * | 4/2009 | Chen et al. | 370/468 |
| 2009/0119285 | A1 * | 5/2009 | Sundaresan et al. | 707/5 |
| 2009/0157651 | A1 * | 6/2009 | Tomkins et al. | 707/5 |
| 2009/0222321 | A1 * | 9/2009 | Liu et al. | 705/10 |

* cited by examiner

*Primary Examiner* — Rehana Perveen
*Assistant Examiner* — Raheem Hoffler
(74) *Attorney, Agent, or Firm* — Maschoff Brennan

(57) ABSTRACT

In an embodiment, a method is provided for presenting a query directed at an information resource. In this method, a number of queries is accessed over a time period. A burst of the number of queries is detected within the time period. It should be noted that a burst is a determinable increase in the number of queries received within the time period relative to a historical number of queries received in a preceding time interval. Event-related information that is associated with the burst in the time is searched, and the query in conjunction with the event-related information is displayed at a display unit.

20 Claims, 9 Drawing Sheets

PRESENTATION OF QUERY WITH EVENT-RELATED INFORMATION

CROSS-REFERENCES TO RELATED APPLICATIONS

This application claims the benefit of U.S. Provisional Application No. 61/053,883, filed May 16, 2008, the disclosure of which is incorporated herein by reference.

FIELD

The present disclosure relates generally to information retrieval. In an embodiment, the disclosure relates to the presentation of query with event-related information.

BACKGROUND

Currently, various web and inventory search engines may list popular searches. For example, an online shopping website may display a list of top ten item searches. However, such a listing does not frequently change because the calculation of the number of submitted searches is typically based on the absolute number of submitted searches. Thus, if there is a sudden increase in the number of searches for a short duration (e.g., hours or a few days), then such increase will most likely not affect such a listing of popular searches because this increase does not significantly add to the total number of submitted searches over a long period of time. This conventional listing is useful to identify trends over a long period of time, but is not useful in detecting current or short-term trends.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
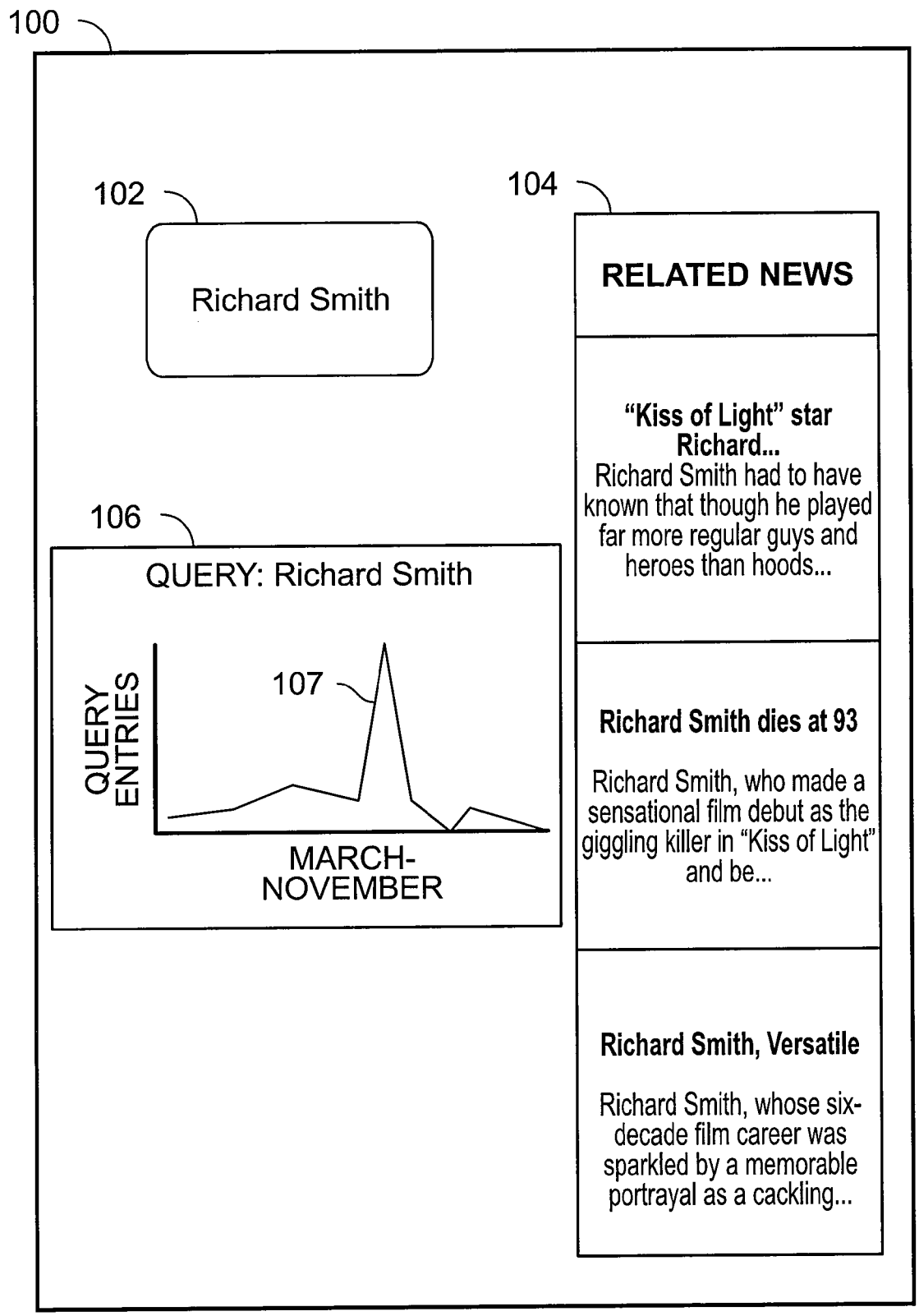
FIG. 1 is a graphical user interface showing a presentation of a query with event-related information, in accordance with an embodiment.

The embodiments described herein provide various techniques for presenting information with a query. FIG. 1 is a graphical user interface 100 showing a presentation of a query 102 with event-related information 104, in accordance with an embodiment. The graphical user interface 100 includes the query 102 "Richard Smith," a graph 106 of query entries over a time period, and event-related information 104. As used herein, a "query," such as query 102, is an enquiry directed at one or more information resources (e.g., information databases). As an example, the query 102 may be an enquiry about one or more items, which include any tangible or intangible thing and/or something that has a distinct, separate existence from other things (e.g., goods, services, electronic files, and land). The terms included in the query 102 may include words, numbers, symbols, and other alphanumeric characters. A user, for example, may enter or submit the query 102 to an online shopping or auction website to locate, purchase, or bid on one or more items.

Embodiments of the invention present the query 102 in a graphical user interface 100 with event-related information 104 that corresponds to a burst of query entries. In general, a "burst" of query entries may refer to, for example, a determinable (e.g., a sudden and sharp) increase in the number of query entries received within a time period relative to a historical number of queries received in a preceding time interval. For example, the graphical user interface 100 includes a graph 106 of query entries over a period of time from March to November. The graph 106 shows a sudden increase 107 in the number of entries of the query "Richard Smith" 102 when compared to a historical number of queries for "Richard Smith" received in a preceding time interval. As explained in more detail below, such a burst may occur when, for example, a rate of increase of the number of query entries exceeds a determinable threshold rate.

Upon detection of a burst of query entries, a search is conducted for event-related information 104 occurring at or near the time of the burst. As used herein, "event-related information" refers to information about any occurrence or something that takes place. In an example, the event-related information is a news story. In another example, the event-related information is an online blog about certain events. In yet another example, the event-related information may be posted messages from an Internet forum. It should be noted that, as used herein, "time" refers to any point or period associated with the occurrence of one or more bursts. For example, time may include dates, minutes, seconds, hours, date ranges, and other time units.

As a result of presenting or displaying the event-related information 104 in conjunction with the query 102, a user can identify from the event-related information 104, for example, a cause for the burst of the number of query entries associated with the query 102. In the example of FIG. 1, a user can identify from the news (a type of event-related information) that the sudden increase 107 associated with the query 102 "Richard Smith" is most likely attributed to an event of the Richard Smith's death at 93 years old. In another example, a user can also use such a display of event-related information 104 to identify whether a trend for a particular item as requested by the query 102 is a fad or a long long-term trend, and therefore can plan his inventory for the particular item based on the anticipated trend.

Figure 2:
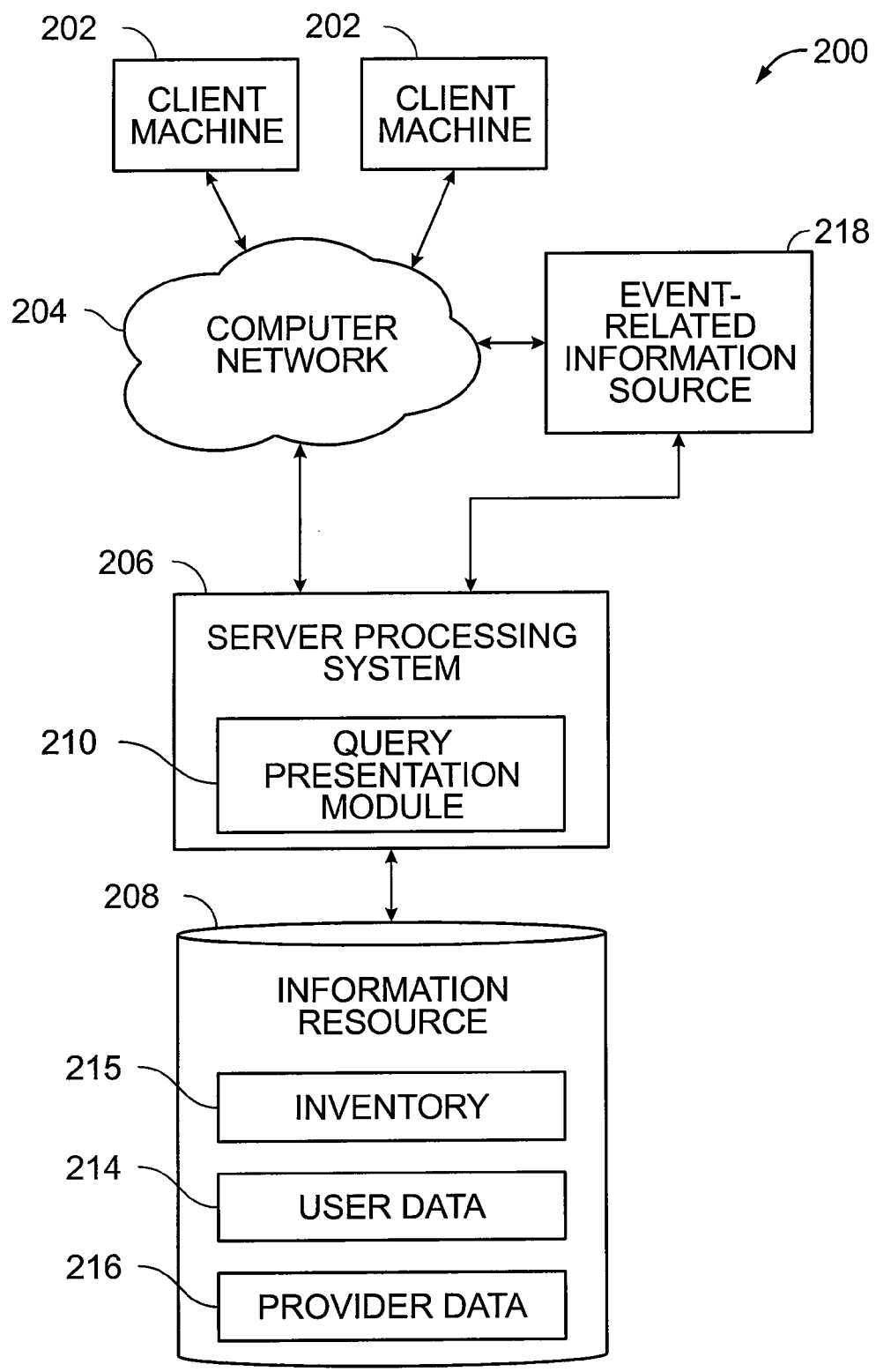
FIG. 2 is a diagram depicting a system, in accordance with an illustrative embodiment, for presentation of a query.

FIG. 2 is a diagram depicting a system 200, in accordance with an illustrative embodiment, for presentation of a query. As depicted, the system 200 includes client processing systems 202 (e.g., personal computer and mobile phone), a server processing system 206 hosting a query presentation module 210, and an event-related information source 218, which are all interconnected by way of a computer network 204. Additionally, the server processing system 206 is in communication with a information resource 208. It should be noted that the computer network 204 is a collection of interconnected processing systems that communicate utilizing wired or wireless mediums. Examples of computer networks, such as the computer network 204, include Local Area Networks (LANs) and/or Wide-Area Networks (WANs), such as the Internet.

In the example of FIG. 2, the client processing systems 202 transmit queries, which are entered or submitted by users of the client processing systems 202 to locate items, to the query presentation module 210. In turn, the query presentation module 210 receives and tracks the queries. When a request is made to the query presentation module 210 to present a particular query, the query presentation module 210 accesses the number of queries and, as explained in more detail below, detects one or more bursts of the number queries.

With the bursts detected, the query presentation module 210 searches for event-related information at or near the time of the occurrence of the bursts. In an embodiment, the query presentation module 210 may search for and retrieve event-related information from the event-related information source 218, which may include a variety of different processing systems that are configured to store event-related information, such as File Transfer Protocol (FTP) servers, list servers, and news servers.

In other embodiments, as explained in more detail below, the query presentation module 210 may also present additional information (e.g., item descriptions and related queries). The query presentation module 210 can search for and retrieve such additional information from the information resource 208 (e.g., a data repository) that is configured to store, for example, item inventories 215, user data 214, provider data 216, and other information.

Figure 3:
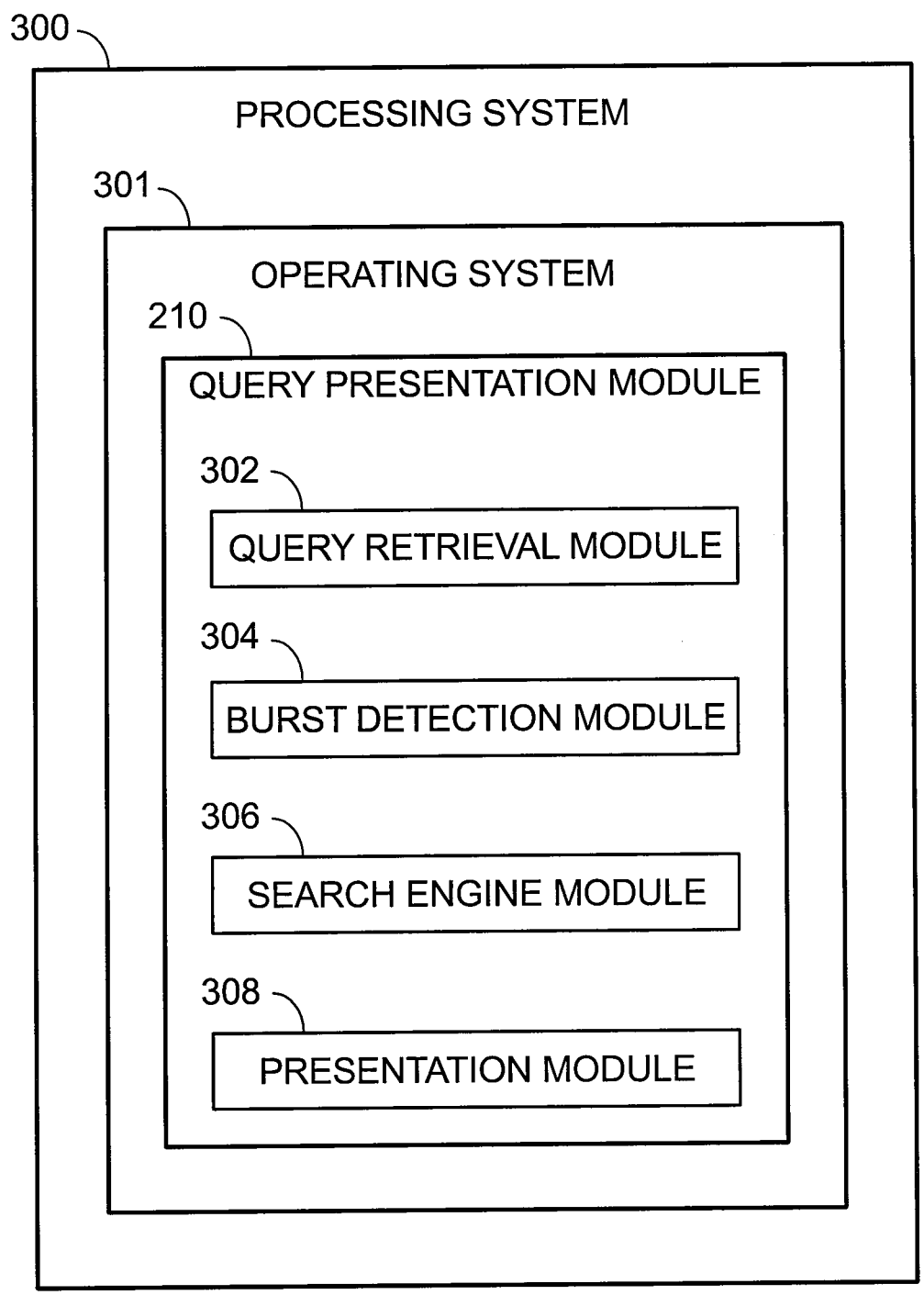
FIG. 3 is a block diagram showing details of a query presentation module, in accordance with an embodiment, included in a processing system that is configured for query presentation.

FIG. 3 is a block diagram showing details of a query presentation module 210, in accordance with an embodiment, included in a processing system 300 that is configured for query presentation. It should be appreciated that the processing system 300 may be deployed in the form of a variety of computing devices, such as server computers (e.g., an application server). As an example, the processing system 300 may form part of the server processing system 206 depicted in FIG. 2. As explained in more detail below, in various embodiments, the processing system 300 may be used to implement computer programs, logic, applications, methods, processes, or software to present the query with event-related information.

As depicted in FIG. 3, the processing system 300 executes an operating system 301 that manages the software processes and/or services executing on the processing system 300. As depicted in FIG. 3, these software processes and/or services may include a query presentation module 210. Included within the query presentation module 210 are a query retrieval module 302, a burst detection module 304, a search engine module 306, and a presentation module 308. The query retrieval module 302 is configured to access and/or track the number of query received by the query presentation module 210. The burst detection module 304 is configured to detect one or more bursts of the number of queries. As explained in more detail below, the burst detection module 304 can detect bursts by examining a rate of increase of the number of queries associated with a query.

The query presentation module 210 can search for a variety of different information. As a result, the search engine module 306 may include a variety of different search functionalities. For example, in one embodiment, the search engine module 306 may be configured to search for event-related information at or near a particular time of the detected bursts. In another embodiment, the search engine module 306 may also be configured to search for items requested by the query.

With the bursts detected, the presentation module 308 is configured to generate and display a graphical user interface that includes, for example, the query and event-related information corresponding to a time associated with the detected bursts. In further embodiments, as explained in more detail below, the presentation module 308 can also be configured to include other information related to the query in the graphical user interface.

It should be appreciate that each module 210, 302, 304, 306, or 308 may be software and/or hardware. Furthermore, it should be noted that in other embodiments, the query presentation module 210 may include fewer, more, or different modules apart from those shown in FIG. 3. For example, in an alternate embodiment, the query presentation module 210 may not include the search engine module 306 and instead relies on other external applications or services for its search.

Figure 4:
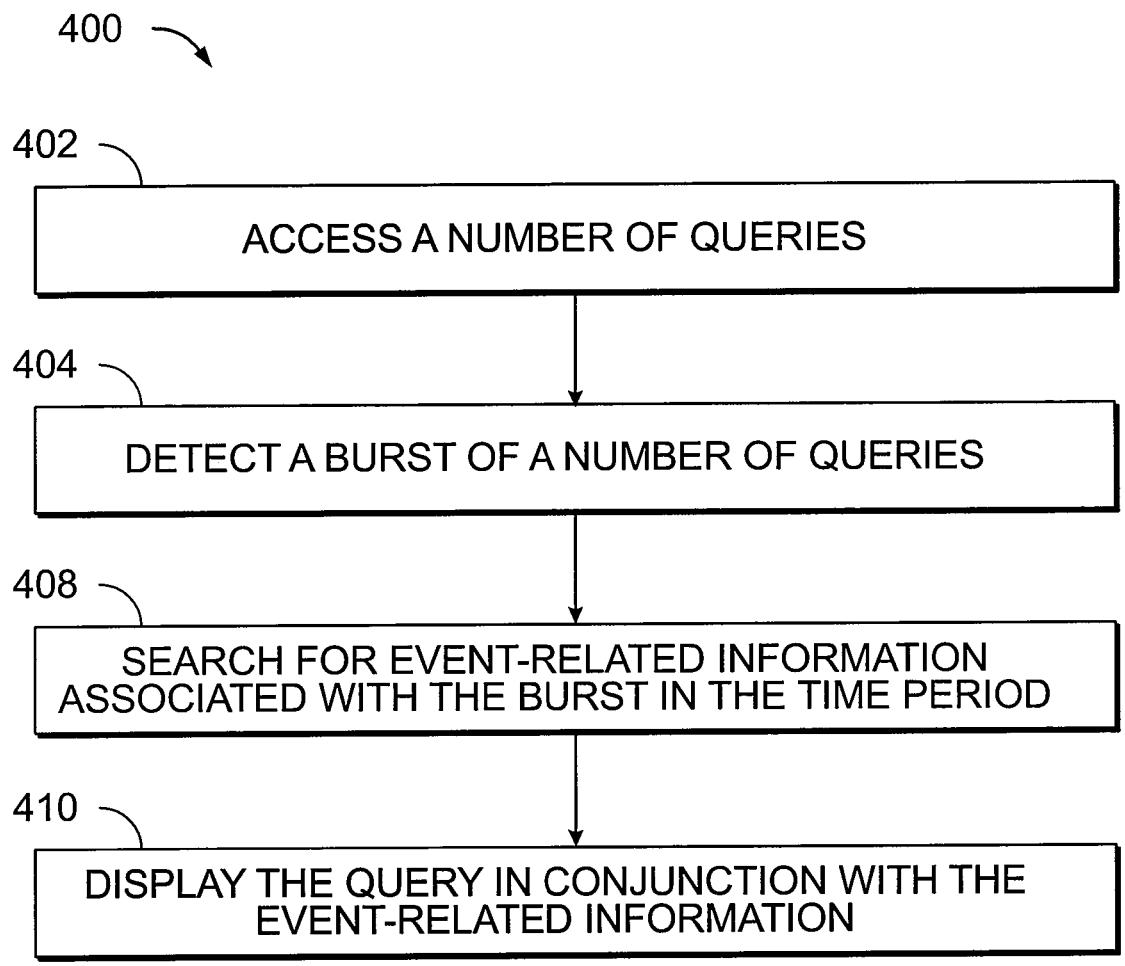
FIG. 4 depicts a flow diagram of a general overview of a method, in accordance with an embodiment, for presenting a query with event-related information.

FIG. 4 depicts a flow diagram of a general overview of a method 400, in accordance with an embodiment, for presenting a query with event-related information. In an embodiment, the method 400 may be implemented by the query presentation module 210 (including, for example, the query retrieval module 302, the burst detection module 304, the search engine module 306, and the presentation module 308) and employed in the processing system 300 of FIG. 3.

As depicted in FIG. 4, a number of queries over a time period are accessed at 402. In particular, a number of query entries associated with one or more queries are accessed. The queries may be entered or submitted by one or multiple, different users. Here, the number of query entries may be tracked over a time period. As a result, from this data, the number of query entries at a particular time or over a period of time can be identified or calculated. Such data may include, for example, 5345 number of query entries of a particular query on Apr. 26, 2006, and additionally include 2342 number of query entries for the same query on Apr. 27, 2006. Another sample data may include 233 number of query entries of a particular query at time 5:30 PM, and additionally include 237 number of query entries of the same query at time 5:31 PM.

The query entries may be associated with one query or with multiple different queries. However, the discussion of FIG. 4 focuses on query entries that are all associated with a single query. The query entries may be associated with the single query based on a variety of different relationships. For example, in an embodiment, the query entries may be associated based on sharing one or more common terms. As used herein, a "common term" is a term included in a query that is similar to another term defined in at least one other query. For example, the identification of the common term may be based on a textual similarity match. A textual similarity match is based on matching characters (e.g., alphanumeric characters) of a portion or a complete term. As an example, the queries "automobile" and "red automobile" share a common term "automobile." The terms do not have to be identical for a textual similarity match. For example, different forms of a term (e.g., plural, singular, and gerund) may be identified as equivalent to the term. As an example, the queries "red apple" and "green apples" share a common term "apple" if the common term is defined as to include plural forms of nouns. In yet another example, all the query entries comprised of the terms "automobile," "automobiles," and "automotive" are associated with the query "automobile." In another embodiment, the query entries may be associated based on one or more semantic relationships. A semantic relationship is a relation between different linguistic units based on, for example, homonymy, synonymy, antonymy, polysemy, paronyms, hypemymy, hyponymy, meronymy, metonymy, holonymy, exocentricity, endocentricity, and linguistic compounds.

Referring to 404, one or more bursts can be identified from the number of queries within the time period. As explained in more detail below, the burst can be identified based on a rate of increase of a number of query entries within the time period. After the burst is identified, a search may be conducted at 408 for event-related information associated with the burst in the time period. It should be noted that the search may be based on a variety of different times attributed to the event-related information. For example, the time specified may be the time of publication of the event-related information. In another example, the time specified may be a time disclosed within the event-related information itself.

With the event-related information located, the query is then displayed at 410 in conjunction with the event-related information. As discussed in more detail below, in other embodiments, other information may also be displayed with the query, such as a plot of the number of query entries over the time period, other related queries, and/or information associated with an item requested by the query.

Figure 5:
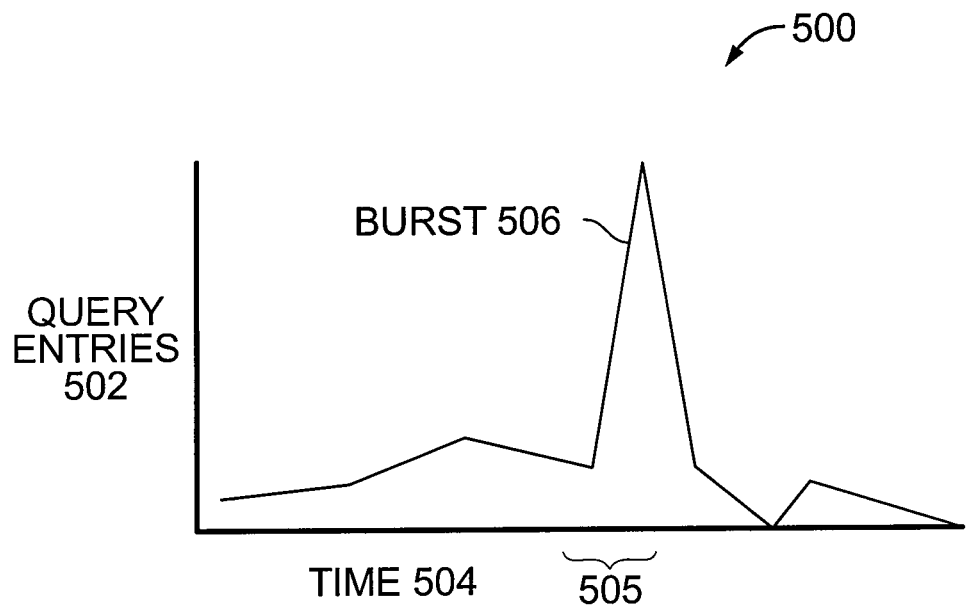
FIG. 5 is a plot of the number of query entries over a time period, in accordance with an embodiment, illustrating the detection of a burst within the time period.
Figure 6:
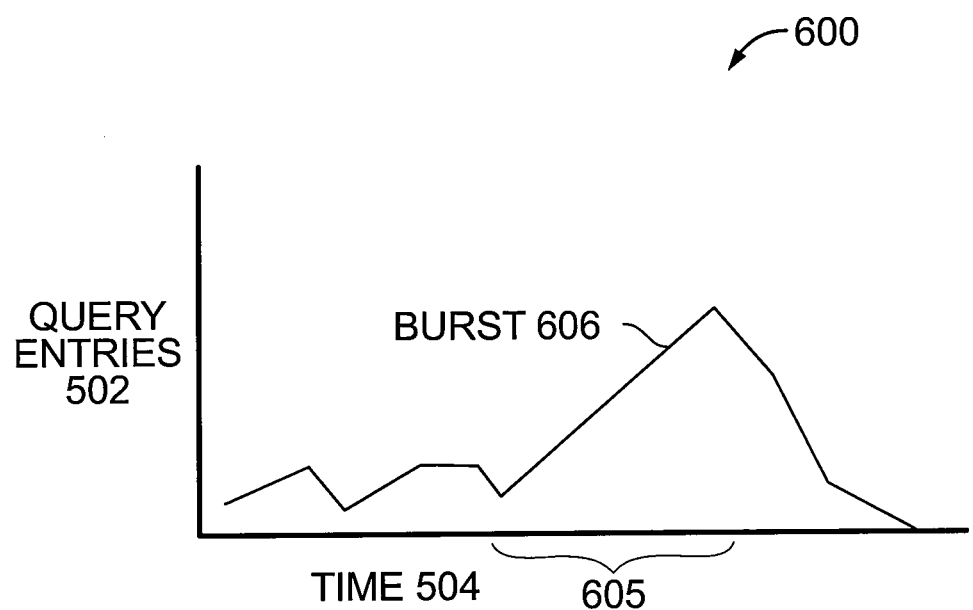
FIG. 6 is a plot of the number of query entries over a time period, in accordance with another embodiment, illustrating the detection of a burst within the time period.

FIGS. 5 and 6 are plots of the number of query entries over a time period, in accordance with some embodiments, illustrating the detection of a burst within the time period. As depicted in FIG. 5, the plot 500 includes a horizontal axis 504, which defines the time increasing from left to right, and also a vertical axis 502, which defines the number of query entries associated with a particular query. A burst may be identified based on a variety of different techniques. In one embodiment, a "burst," such as burst 506, refers to a rate of increase of the number of query entries that exceeds a particular threshold rate. The rate of increase is the change in the number of query entries within a particular time period. In other words, the burst (b) may be defined as:

$$b = \Delta N / \Delta T > \text{Threshold Rate}$$

where the $\Delta N$ is the change in the number of query entries and the $\Delta T$ is a change in time.

As used herein, the "threshold rate" is a predefined value defining a limit of a rate of increase at which it qualifies as a burst. It should be appreciated that the threshold rate may include a wide range of different values, depending on the type of the query being requested. For example, the threshold rate may be a relatively large number when compared to a historical number of query entries received in a preceding time interval. This relatively large number may indicate a steep increase, and the plot 500 depicted in FIG. 5 shows a steep slope at time period 505 (or change in time) where this burst 506 is relatively sudden and large when compared to the historical number of previous entries.

On the other hand, the threshold rate can also be a relatively small number, which indicates a gradual slope or slow rate of increase. The plot 600 depicted in FIG. 6 shows a gradually increasing slope of a number of query entries within time period 605. This type of burst 606, defined by a relatively small threshold rate when compared to the threshold rate in FIG. 5, is gradual and occurs within a longer time period 605 than time period 505.

Figure 7:
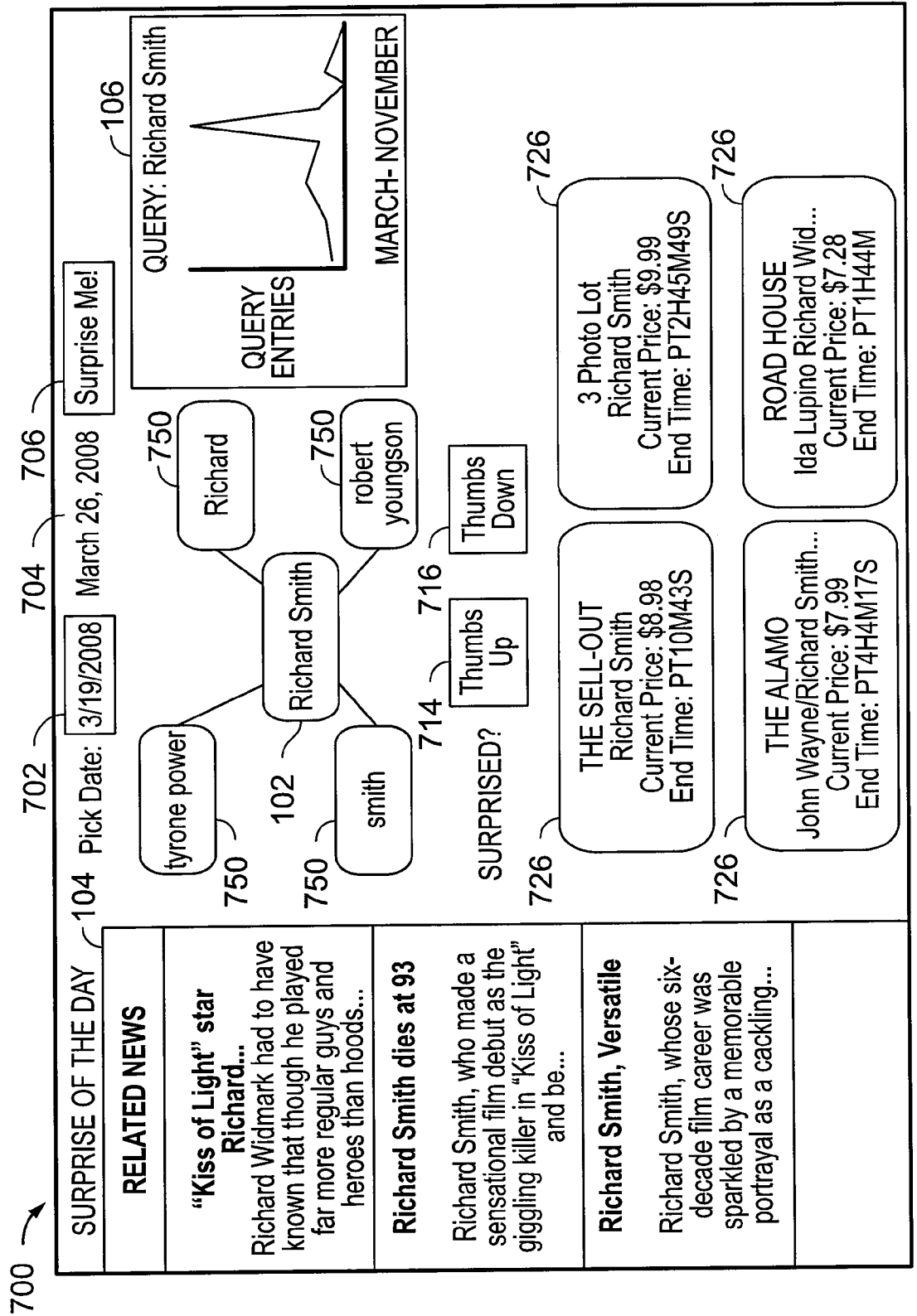
FIG. 7 is another graphical user interface showing a presentation of a query with event-related information, in accordance with an alternate embodiment.

FIG. 7 is another graphical user interface 700 showing a presentation of a query with event-related information, in accordance with an alternate embodiment. Similar to the graphical user interface 100 depicted in FIG. 1, the graphical user interface 700 depicted in FIG. 7 also includes the query 102 "Richard Smith," a graph 106 of query entries over a period of time, and event-related information 104. However, in this embodiment, the graphical user interface 700 also includes related queries 750, information 726 associated with the item requested by the query 102, a thumbs-up selection 714, a thumbs-down selection 716, a surprise me selection 706, and a time input field 702.

In addition to the query 102, the graphical user interface 700 in the example of FIG. 7 also includes related queries 750, which may be entered by the same user or by different users, and that are related to the query 102. The queries 102 and 750 may be depicted in a query network graph where each node of the graph represents a unique query, and defined within the nodes are the terms that comprise the query. The connecting lines between the queries 102 and 750 represent their relationships. For example, the query network graph depicted in FIG. 7 shows that the query "Richard Smith" 102 is related to the query "richard" 750 by their connection. Similarly, the query network graph shows that the query "Richard Smith" 102 is also related to the query "tyrone power" 750.

The relationships between queries 102 and 750 may be inferred based on a variety of different techniques. In one embodiment, one or more common terms are identified between the terms included in queries 102 and 750. For example, the identification of the common term may be based on a textual similarity match, which is explained above.

In another embodiment, queries 102 and 750 may be related by their associations with a single search session. A "single search session," as used herein, refers to a series of queries inputted or submitted by a single user. The single search session may be defined by a series of consecutive queries inputted within a predefined time period. For example, a series of queries may be included in a single search session if these queries are inputted consecutively within five minutes. In another example, a series of queries may be identified to be associated with a single search session if the time between the inputs of the queries does not exceed, for example, ten seconds. Alternatively, a series of queries may be included in a single set search session based on a purchase of an item resulting from the input of the queries. For example, a user may input a series of queries to locate one or more items. If the user purchases an item, then the series of queries used to locate the item may be identified to be associated with a single search session.

In still another embodiment, the queries 102 and 750 may be related based on attributes of items retrieved from the queries 102 and 750. It should be noted that the queries 102 and 750 may be entered to locate for one or more items. An "attribute," as used herein, refers to a property belonging to an item, which may be defined in a title assigned to an item or defined in a description associated with the item. Examples of attributes include size, shape, color, construction material, country of manufacture, brand name, category assigned to the item, serial number, and other attributes. A relationship between the attributes can be identified based on a variety of relationships. For example, the relationship may be based on the identification of a common term between the attributes. In another example, the relationship may be based on an identification of a semantic relationship, which is discussed above. As an example, the attributes "joyful" and "elated" may be related because they are synonyms.

Still referring to FIG. 7, information 726 associated with one or more items retrieved from the query 102 may also be displayed with the query 102, in accordance with an embodiment. Such information 726 may refer to a variety of information regarding one or more items that are posted or associated with the items retrieved from the query 102. Examples of such information 726 include descriptions and, as described above, attributes of the items.

The time input field 702 provides a field for a user to manually input a particular time for use in the search of the event-related information 726. For example, the user may input a particular date in the time input field 702 to search for and display all event-related information 104 published at that particular date. The surprise me selection 706 may be selected by the user to select a random or pseudorandom time for use in the time input field 702.

Finally, the thumbs-up selection 714 and the thumbs-down selection 716 may be used to receive user feedback. For example, the thumbs-up selection 714 may be used to indicate that a user was surprised by the event-related information 104 displayed. The thumbs-down selection 716 may be used to indicate that the user was not surprised by the displayed event-related information 104. As explained in more detail below, one use of the user feedback is to rank the event-related information 104.

Figure 8:
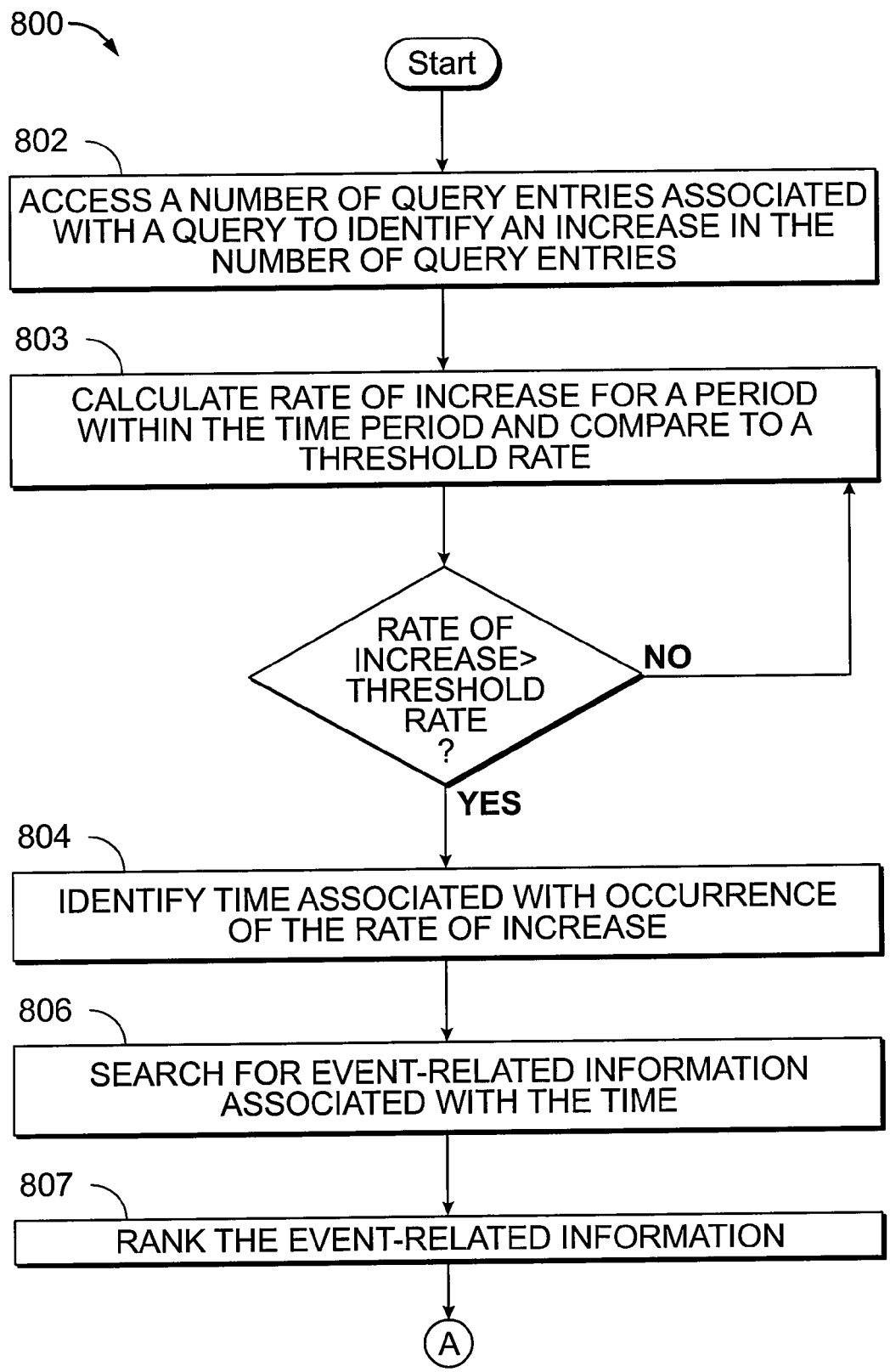
FIG. 8 depicts a flow diagram of a detailed method, in accordance with another embodiment, for query presentation.
Figure 8:
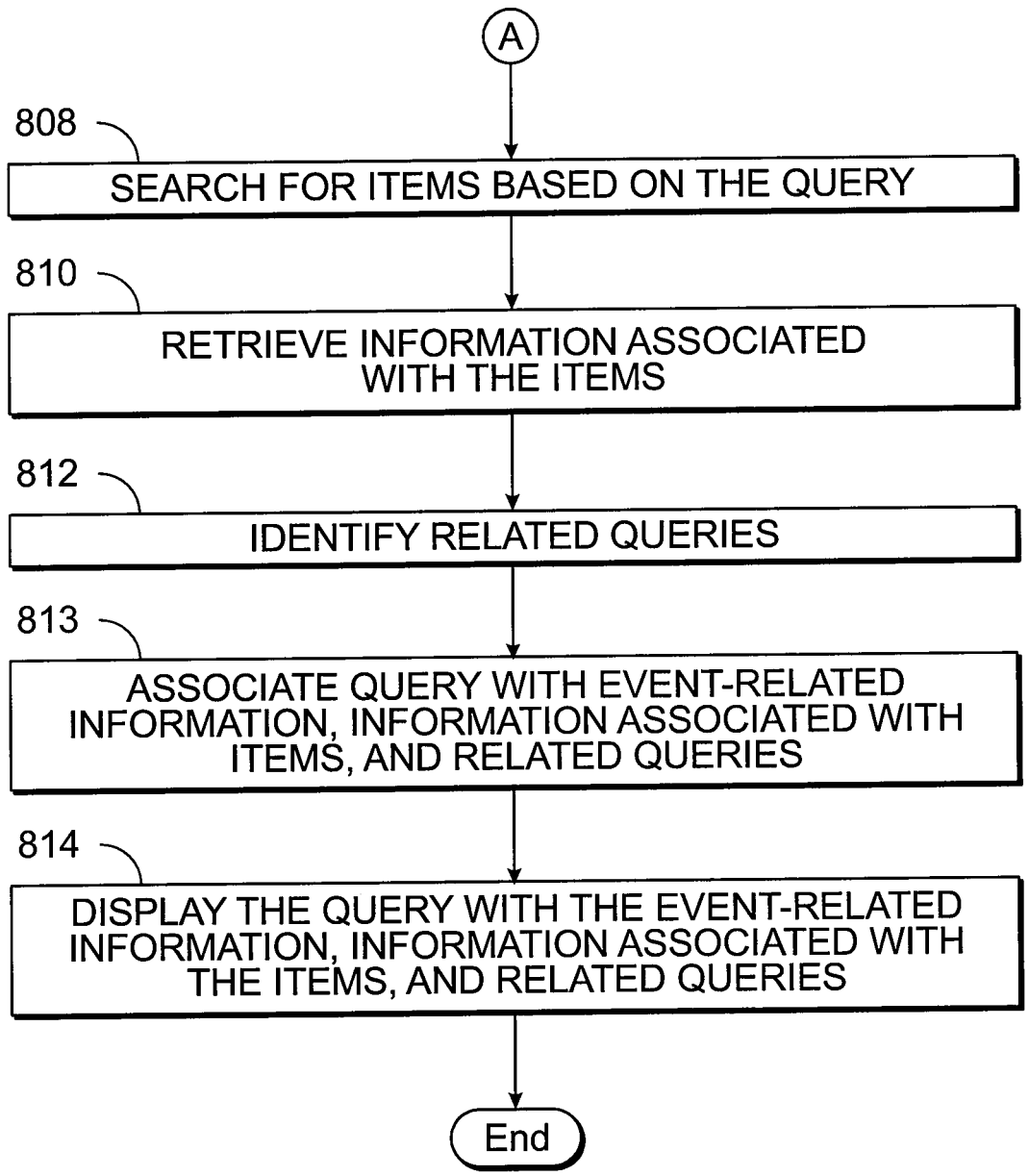

FIG. 8 depicts a flow diagram of a detailed method 800, in accordance with another embodiment, for query presentation. In an embodiment, the method 800 may be implemented by the query presentation module 210 and employed in the processing system 300 of FIG. 3. Starting at 802, the query presentation module accesses a number of query entries over a time period and identifies an increase in the number of query entries within the time period. The rate of increase is calculated for a particular period within the time period, and this rate of increase is compared with a threshold rate at 803. If this rate of increase is less than the threshold rate, then a burst is not detected. As a result, the query presentation module returns to 803 and calculates a rate of increase for another period within the time period.

On the other hand, if this rate of increase is greater than the threshold rate, then a burst is detected. At 804, the query presentation module identifies a time associated with the burst (or occurrence of the rate of increase). With the time identified, the query presentation module then searches for event-related information associated with the identified time at 806. In an embodiment, the search is independent of the query. For example, the search may search for any event-related information that is published at the identify time. In another embodiment, the search is dependent or based on the query. That is, the query presentation module may use the identified time and the query as criteria for its search. For example, if the identified time is Jun. 6, 2007 and the query specifies "toy," then the query presentation module searches for event-related information that is published on Jun. 6, 2007 with terms that include "toy."

In this embodiment, the query presentation module may further rank the event-related information relative to each other at 807. Given that there is limited space within the graphical user interface to display the event-related information, not all the event-related information may be displayed within the graphical user interface. As a result, the query presentation module may be configured to display only the top five, for example, event-related information. The ranking may be based on a variety of different factors. For example, in an embodiment, each event-related information can be ranked based on an inventory of a related item. For example, if there is plenty of inventory for a particular item requested by the query, then the query presentation module may rank event-related information that discusses the item higher than event-related information that does not discuss the item. In another embodiment, each event-related information may be ranked based on the number of instances of locating the event-related information. That is, the event-related information may be ranked based on the number of hits in a search. For example, event-related information with a large number of hits may be ranked higher than other event-related information with a lower number of hits.

In one embodiment, the query presentation module may additionally search at an information resource based on the query. For example, as depicted at 808, the query presentation module may additionally search for items requested by the query at an information resource and, as discussed above, retrieve information associated with the items at 810 from the information resource. In yet another embodiment, as also discussed above, the query presentation module may also identify related queries at 812. The query presentation module at 813 then associates the query with the event-related information, information associated with the items, and related queries, and displays them at a display unit at 814.

Figure 9:
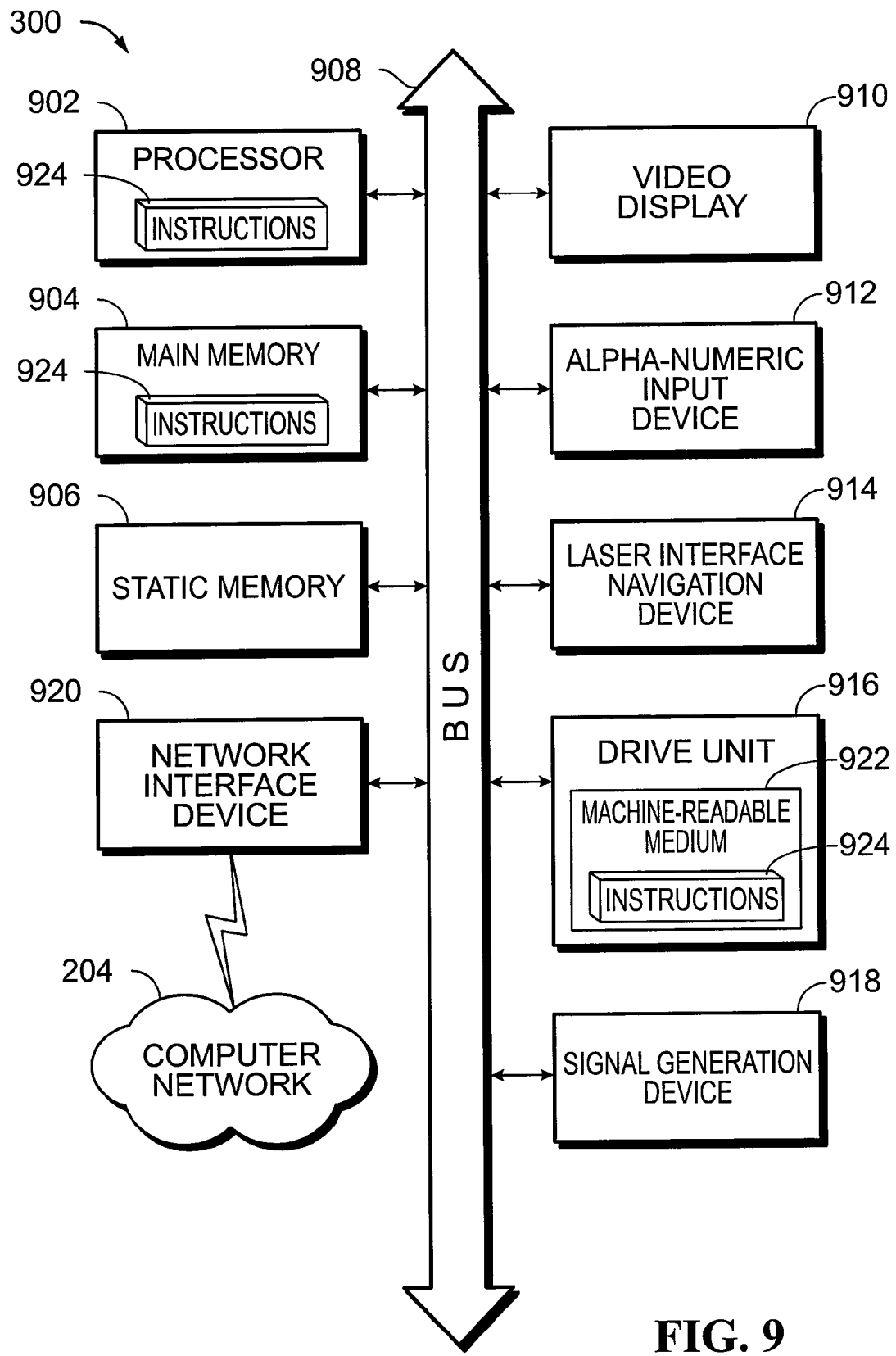
FIG. 9 is a block diagram of a machine in the example form of a processing system within which may be executed a set of instructions for causing the machine to perform any one or more of the methodologies discussed herein.

FIG. 9 is a block diagram of a machine in the example form of a processing system 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 300 includes a processor 902 (e.g., a central processing unit (CPU), a graphics processing unit (GPU) or both), a main memory 904, and static memory 906, which communicate with each other via bus 908. The processing system 300 may further include video display unit 910 (e.g., a plasma display, a liquid crystal display (LCD) or a cathode ray tube (CRT)). The processing system 300 also includes an alphanumeric input device 912 (e.g., a keyboard), a user interface (UI) navigation device 914 (e.g., a mouse), a disk drive unit 916, signal generation device 918 (e.g., a speaker), and network interface device 920.

The disk drive unit 916 includes machine-readable medium 922 on which is stored one or more sets of data structures and instructions 924 (e.g., software) embodying or utilized by any one or more of the methodologies or functions described herein. The data structures and instructions 924 may also reside, completely or at least partially, within main memory 904 and/or within processor 902 during execution thereof by processing system 300, main memory 904 and processor 902 also constituting machine-readable, tangible media.

The data structures and instructions 924 may further be transmitted or received over computer network 204 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

While the embodiments of the invention(s) is (are) described with reference to various implementations and exploitations, it will be understood that these embodiments are illustrative and that the scope of the embodiments of the invention(s) is not limited to them. In general, techniques for query presentation may be implemented with facilities consistent with any hardware system or hardware systems defined herein. Many variations, modifications, additions, and improvements are possible.

Plural instances may be provided for components, operations or structures described herein as a single instance.

Finally, boundaries between various components, operations, and data stores are somewhat arbitrary, and particular operations are illustrated in the context of specific illustrative configurations. Other allocations of functionality are envisioned and may fall within the scope of the embodiments of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of embodiments of the invention(s).

What is claimed is:

1. A method comprising:
accessing a number of a plurality of queries about an item over a time period;
detecting a burst of the number of the plurality of queries within the time period, the burst being an increase in the number of the plurality of queries received within the time period relative to a historical number of queries about the item received in a preceding time interval, the increase to exceed a threshold rate;
searching for event-related information that is associated with the burst in the time period, the event-related information including a plurality of different event-related information of different events corresponding to the item;
ranking each event-related information from the plurality of different event-related information relative to each other;
in response to the detection of the burst, accessing a graph showing the burst; and
presenting a signal for displaying, at a display unit, the query, the graph, and the identified event-related information on the display unit, the corresponding event-related information being displayed at the display unit based on the ranking.

2. The method of claim 1, further comprising:
searching at the information resource based on the query; and
retrieving information associated with the information resource based on locating the information resource, wherein the information associated with the information resource is displayed in conjunction with the query and the event-related information.

3. The method of claim 1, wherein the burst is detected based on a rate of increase of the number of the plurality of query entries.

4. The method of claim 1, wherein each event-related information is ranked based on a number of a plurality of instances of locating each event-related information.

5. The method of claim 1, wherein each event-related information is ranked based on an inventory of the item.

6. The method of claim 1, wherein the event-related information is a news story.

7. The method of claim 1, wherein the event-related information is a blog.

8. The method of claim 1, wherein the graph is a line graph.

9. A machine-readable medium that stores instructions, which, when performed by a machine, cause the machine to perform operations comprising:
accessing a number of a plurality of query entries over a time period, the plurality of query entries being associated with a query and being entered by a plurality of different users;
detecting that a rate of increase of the number of the plurality of query entries exceeds a threshold rate within the time period;
identifying a time within the time period associated with an occurrence of the rate of increase exceeding the threshold rate;
searching for event-related information that is associated with the time and based on the query, the event-related information including a plurality of different event-related information of different events corresponding to the query associated with the burst of the number of the plurality of queries in the time period;
ranking each event-related information from the plurality of different event-related information relative to each other;
associating the event-related information with the query;
in response to the detecting that the rate of the increase of the number of the plurality of query entries exceeds the threshold within the time period, accessing a graph showing the number of query entries within the time period and a historical number of queries received in a preceding time period; and
presenting a signal for displaying, at a display unit, the query, the graph, and the identified event-related information corresponding to the query on the display unit, the corresponding event-related information being displayed at the display unit based on the ranking.

10. The machine-readable medium of claim 9, wherein the instructions, when performed by a machine, cause the machine to perform operations further comprising identifying a further query related to the query, wherein the further query is displayed with the query and the event-related information.

11. The machine-readable medium of claim 10, wherein the further query is related to the query based on a common term shared between the further query and the query.

12. The machine-readable medium of claim 10, wherein the further query is related to the query based on the further query and the query being associated with a single search session.

13. The machine-readable medium of claim 10, wherein the further query is related to the query based on identifying a relationship between a first attribute of a first item retrieved from the query and a second attribute of a second item retrieved from the further query.

14. The machine-readable medium of claim 9, wherein the rate of increase is a change in the number of the plurality of query entries within the time period.

15. A processing system comprising:
at least one processor; and
a memory in communication with the at least one processor, the memory being configured to store a query presentation module that is executable by the at least one processor, the query presentation module having instructions that, when executed by the at least one processor, cause operations to be performed, the operations comprising:
accessing a number of a plurality of query entries over a time period, the plurality of query entries being associated with a query;
detecting a burst of the number of the plurality of query entries within the time period, the burst being an increase in the number of the plurality of queries received within the time period relative to a historical number of queries received in a preceding time interval, the increase to exceed a threshold rate;

identifying a time within the time period associated with an occurrence of the burst;

searching for event-related information of from a plurality of different events corresponding to the query associated with the burst of the number of the plurality of queries in the time period;

ranking each event-related information from the plurality of different event-related information relative to each other;

searching for an item based on the query;

retrieving information associated with the item based on locating the item;

in response to the detection of the burst, accessing a graph showing the burst; and presenting a signal for displaying the query, the graph, and the identified event-related information corresponding to the query on the display unit along with the information associated with the item, the identified event-related information being displayed based on the ranking.

16. The processing system of claim 15, wherein the operations further comprise receiving user feedback of the display of the query with the plurality of different event-related information and the information associated with the item, wherein the ranking is based on the user feedback.

17. The processing system of claim 15, wherein the information associated with the item comprises a description of the item.

18. The processing system of claim 15, wherein the information associated with the item comprises an attribute of the item.

19. The system of claim 15, wherein the operations further comprise identifying a further query related to the query, and wherein the further query is displayed along with the query, the graph, and the identified event-related information.

20. A system for presenting a query of an information resource, the system comprising:

a hardware query retrieval module to access a number of a plurality of queries over a time period;

a hardware burst detection module to detect a burst of the number of the plurality of queries within the time period, the burst to exceed a threshold rate, and to identify a time within the time period associated with an occurrence of the burst;

a hardware search engine module to search for event-related information associated with the time, the event-related information including a plurality of different event-related information of different events corresponding to a query associated with the burst of the number of the plurality of queries in the time period; and a hardware presentation module to:

rank each event-related information from the plurality of different event-related information relative to each other, in response to the detection of the burst, access a graph showing the burst and a historical number of queries received in a preceding time period; and present a signal to display the query, the graph, and the identified event-related information corresponding to the query on the display unit, the corresponding event-related information being displayed at the display unit based on the ranking.

* * * * *